May 27, 1930.   A. O. MOE   1,760,369
CONVEYER FOR FRUITS AND VEGETABLES
Filed Aug. 22, 1928   3 Sheets-Sheet 3
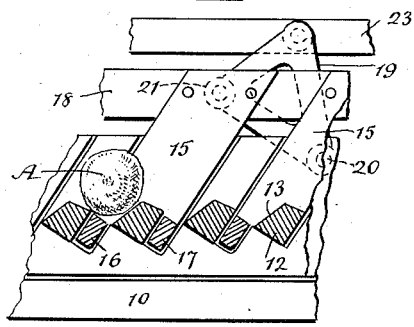
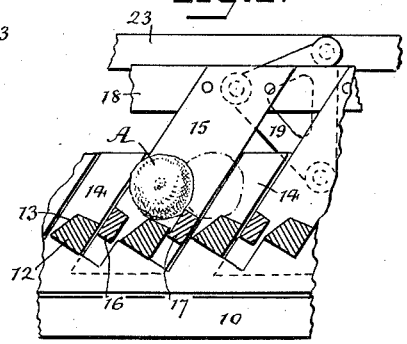
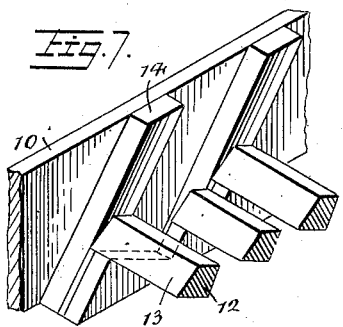
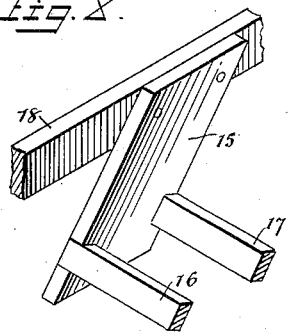
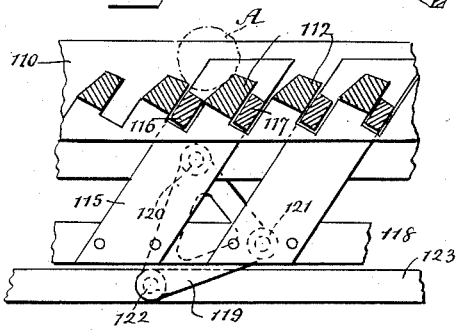
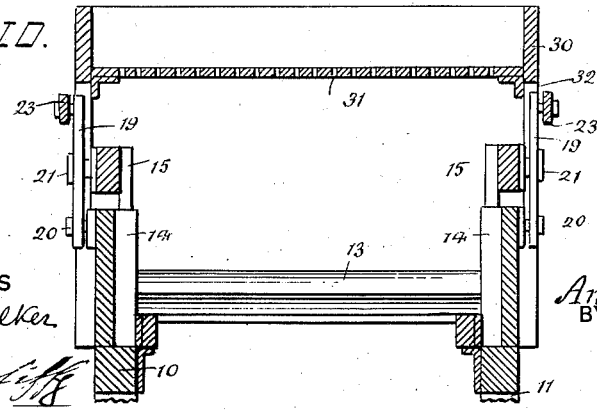
INVENTOR
Andrew O. Moe
BY
ATTORNEY
WITNESSES Patented May 27, 1930

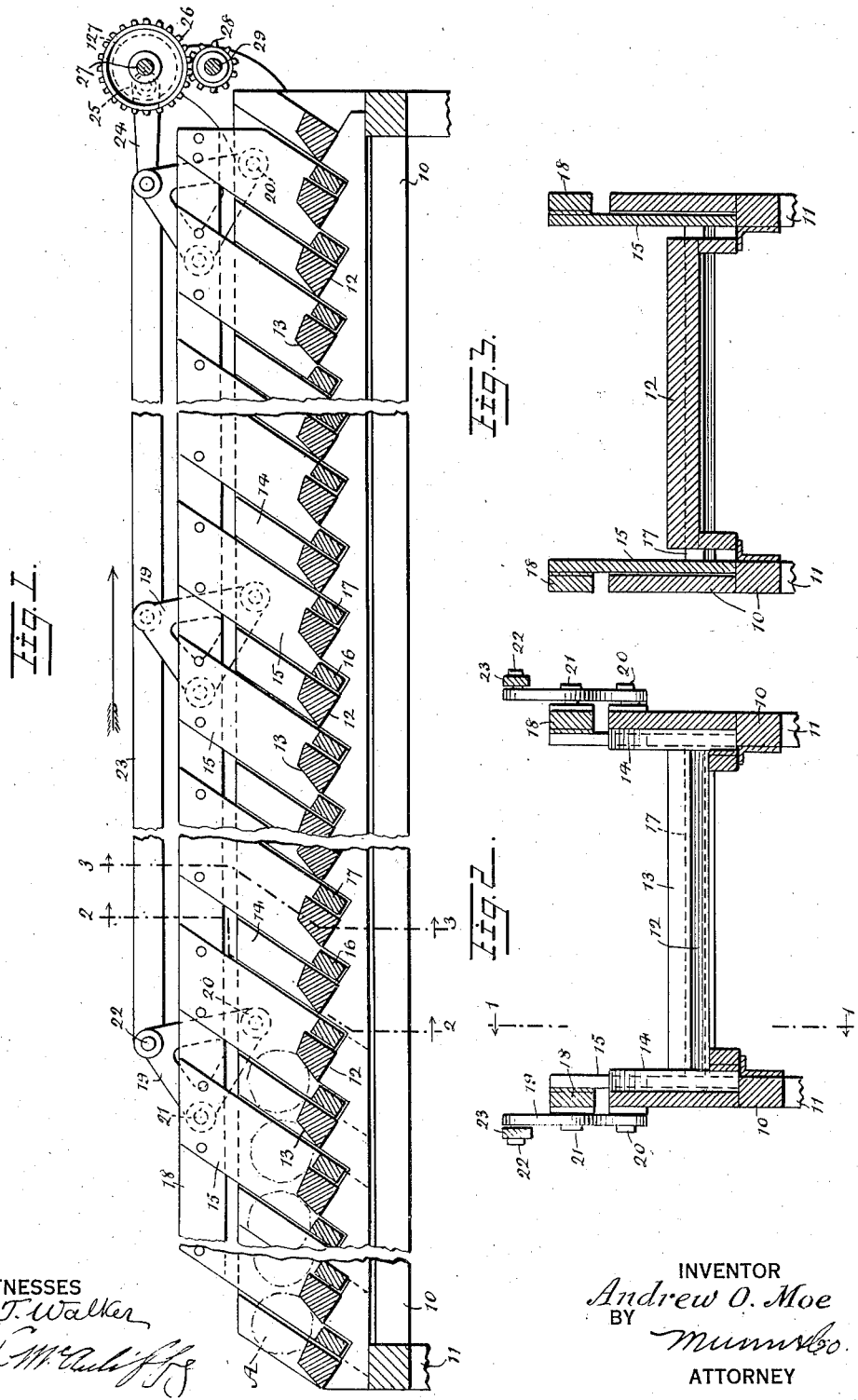

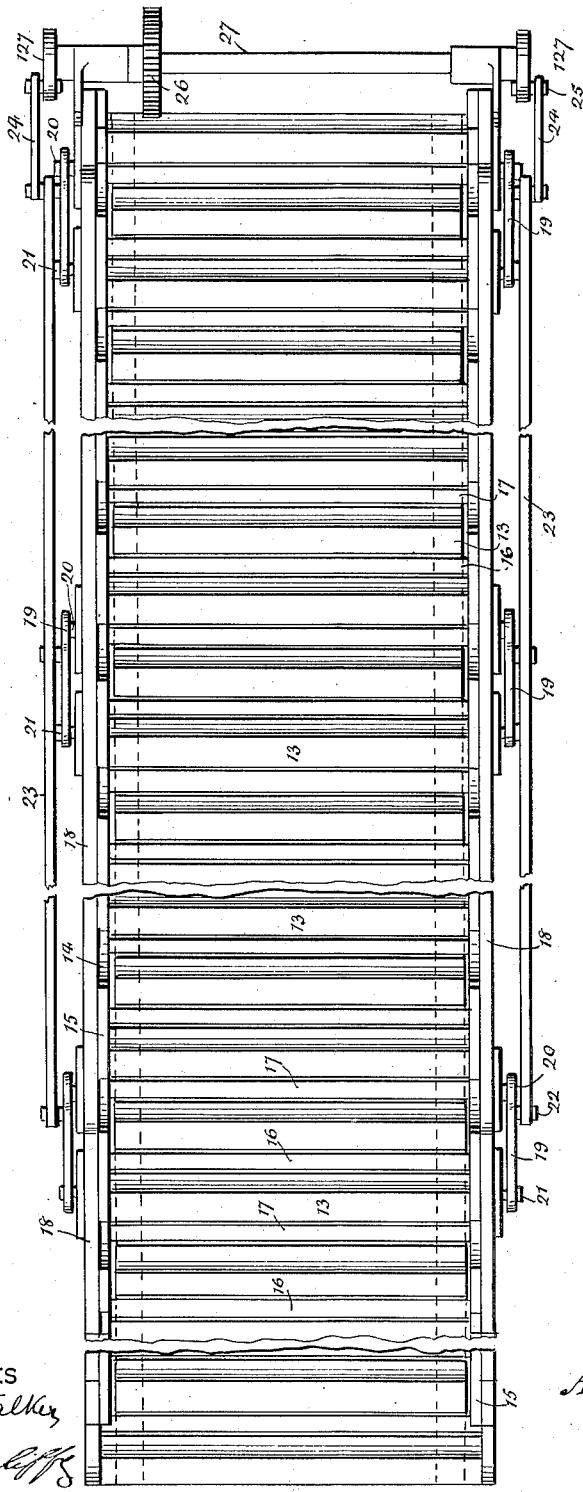

1,760,369

UNITED STATES PATENT OFFICE

ANDREW O. MOE, OF TOPPENISH, WASHINGTON, ASSIGNOR TO FOOD MACHINERY CORPORATION, OF SAN JOSE, CALIFORNIA

CONVEYER FOR FRUITS AND VEGETABLES

Application filed August 22, 1928. Serial No. 301,245.

My invention relates to means for causing travel of fruits and vegetables from one point in a packing and sizing plant to another, or in conveying the fruits and vegetables through a washing apparatus, or the like.

The general object of my invention is to provide a novel means for causing a step-by-step movement of the fruits and vegetables through the machine in a manner to prevent bruising.

The nature of my invention and its distinguishing features and advantages will clearly appear as the description proceeds.

Reference is to be had to the accompanying drawings forming part of this specification, it being understood that the drawings are merely illustrative of examples of the invention.

Figure 1 is a longitudinal vertical section on the line 1—1 of Figure 2;

Figure 2 is a cross section as indicated by the line 2—2 in Figure 1, parts being omitted;

Figure 3 is a section taken on the line 3—3 in Figure 1;

Figure 4 is a plan view of the machine, parts being broken out;

Figure 5 is a detail in longitudinal vertical section indicating the position of the fruit or vegetable prior to the movement of displacing elements for advancing the fruit;

Figure 6 is a view similar to Figure 5, but indicating the progress of the fruit or vegetable from the postion shown in Figure 5;

Figure 7 is a fragmentary view in perspective showing a portion of the fixed structure including temporary rest members for the fruit and guide members for the displacing elements;

Figure 8 is a fragmentary perspective view of a fragment of the fruit or vegetable displacing elements;

Figure 9 is a fragmentary view in longitudinal section illustrating a different arrangement of the elements in the machine, the displacing element being inverted as compared with the arrangement shown in Figures 1 to 8;

Figure 10 is a cross section showing the employment of the arrangements of Figures 1 to 8 in connection with washing means for the fruits and vegetables.

In carrying out my invention in accordance with the illustrated example, a suitable frame 10 is provided which may be supported by legs indicated in part at 11. On the frame 10 disposed transversely between the sides of the frame are rest members 12 having oblique faces 13. Said rest members 12 extend between side guides 14 obliquely disposed in the frame 10.

The side guides 14 serve to guide the obliquely disposed reciprocating side members 15 between which extend the displacing transverse bars 16 and 17 disposed respectively at the front and rear of each rest member 12. The several reciprocating side members 15 are connected rigidly with one another by a bar 18 to which they are secured.

Suitable means to reciprocate the displacing means is provided, there being indicated for the purpose in the illustrated example bell crank levers 19 fulcrumed at one angle, as at 20, to the sides of the frame 10, and pivoted to the bars 18, as at 21. Said bell crank levers are pivotally connected with the reciprocating bars 23, as at 22. The reciprocating bars 23 are actuated by pitman 24 connected with said bars 23 at one end and secured at the opposite ends to wrist pins 25 on crank discs 127 on a transverse shaft 27. On the shaft 27 is a pinion 26, which is here shown as meshing with a pinion 29 fixed on a drive shaft 28 which may be actuated by any suitable means.

In an apparatus constructed as described, the essential operation is that the displacing means has movement relatively to the rest members so as to engage the fruits or vegetables being moved through the machine to cause them to roll gently from the rest members to that displacing member in advance, so that at the next step the fruits or vegetables will be moved on to the next succeeding rest member.

In the arrangement shown in Figure 9, a frame designated 110 is uppermost and the reciprocating propelling means is arranged below the elements of the previously described construction. Thus, in the frame 110 are rest members 112 corresponding with the first described members, and the displacing members 116 and 117 correspond with the members 16 and 17 and extend between the cross members 115 carried by connecting bars 118 disposed below the sides of the frame 110. The bell crank 119 in form corresponds to the bell cranks 19 and are pivoted to the reciprocating bars 123, at 122, as well as being pivoted at 121 to the sides 116 carrying the displacing members 116, 117 and are pivoted also at 120 to the frame 110.

The operation gives the same result and the movements correspond except that the parts of the assemblage are the reverse in positions to the first described construction.

In Figure 10 the parts are the same as those first described and are correspondingly numbered. There is, however, in this case a receiver 30 for washing fluid which escapes through perforations 31 in the bottom of the receiver. Said receiver is shown on supporting members 32 rising from the frame 10.

I would state furthermore that while the illustrated examples constitute practical embodiments of my invention, I do not limit myself to the exact details herein illustrated, since, manifestly, the same can be considerably varied without departure from the spirit of the invention as defined in the appended claims.

I claim:

1. In a machine of the class described, obliquely disposed guide members, obliquely disposed reciprocating members and disposed at right angles to the path of articles which are to be moved between the guide members, fixed rests extending between the guide members, and transversely disposed displacing members on opposite sides of each rest member and movable with the reciprocating members; together with longitudinal bars to which said reciprocating members are secured, and means to actuate said bars.

2. In an apparatus of the class described, obliquely disposed transverse displacing members, rest members between each pair of transverse members, reciprocating elements carrying said transverse displacing members and movable in oblique paths, and means to actuate said reciprocating elements, said actuating means including longitudinal bars to which the reciprocating elements are secured, bell cranks having a fixed pivot at one angle and pivoted at a second angle thereof to said actuating means, longitudinal bars to which the bell cranks are connected at the remaining angles, and means to actuate said last mentioned bars.

3. A machine for causing fruits and vegetables to travel along a longitudinal path, rest members located at right angles to the path of travel of the vegetables and a pair of displacing members located upon opposite sides of a rest member and movable in a path which is at an angle to the vertical for moving the fruits or vegetables consecutively along the rest members, the displacing members co-operating with the rest members for supporting the fruits or vegetables temporarily when the fruits or vegetables are moved from one rest member to another rest member.

4. An apparatus for conveying articles comprising a mechanism supporting framework, movable and fixed means for forming the sole support for rollable articles resting thereon, comprising a series of substantially alternately arranged fixed and movable bars with their lengthwise dimension positioned at substantially right angles to the line of movement imparted to articles resting thereon, means for imparting an upward movement to said movable bars to carry their upper faces above the upper faces of the fixed bars, with inclined faces on both sets of bars, to impart a forward rolling movement to articles thereon when said movable bars are in motion.

5. An apparatus for conveying articles comprising a mechanism supporting framework, movable and fixed means forming the sole support for rollable articles resting thereon, comprising a series of substantially alternately arranged fixed and movable bars with their lengthwise dimension positioned at substantially right angles to the line of movement imparted to articles resting thereon, means for imparting an upward movement to said movable bars to carry their upper faces above the upper faces of the fixed bars, to impart rolling movement to articles thereon when said movable bars are in motion.

ANDREW O. MOE.